United States Patent Office 3,563,765
Patented Feb. 16, 1971

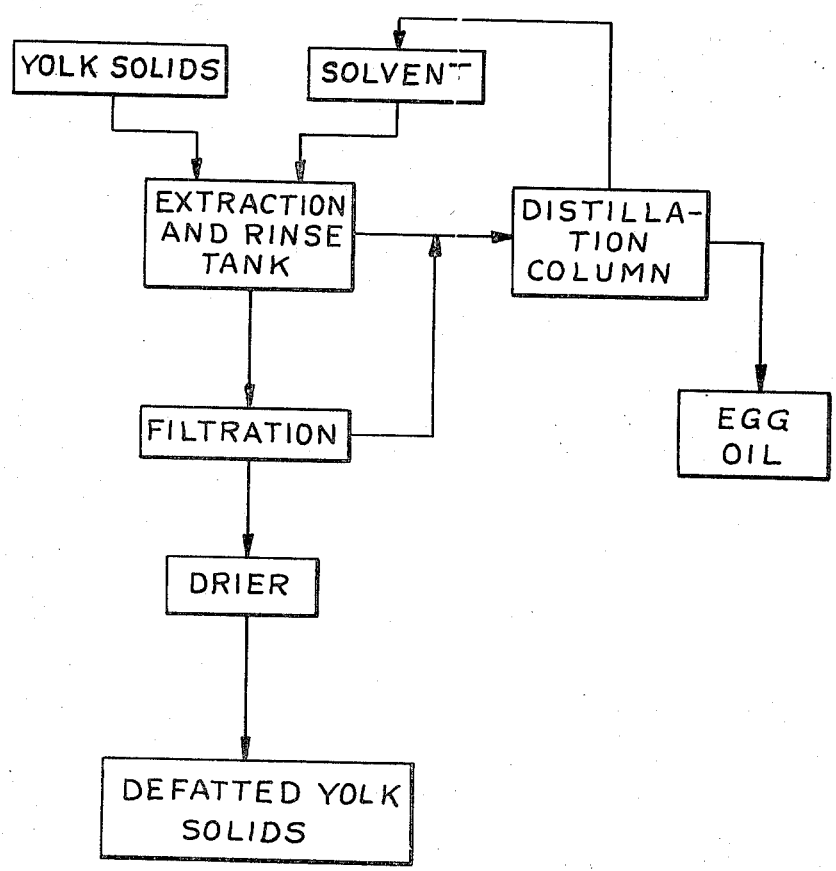

3,563,765
LOW CHOLESTEROL DRIED EGG YOLK AND PROCESS
Daniel Melnick, Teaneck, N.J., assignor to CPC International Inc., New York, N.Y., a corporation of Delaware
Filed Aug. 31, 1967, Ser. No. 664,679
Int. Cl. A23b 5/02; A23j 1/08; A23l 1/32
U.S. Cl. 99—113                                          11 Claims

ABSTRACT OF THE DISCLOSURE

The present invention is related to the production of a partially defatted dry egg yolk product. Conventional dry egg yolk solids are treated with a fat solvent at a temperature less than 160° F. to extract at least 50% but not more than 90% of the original fat from the egg yolk solids. Simultaneously, at least 50% of the cholesterol content of the egg yolk is extracted. Preferred solvents are non-polar solvents or mixtures of solvents containing at least a major portion of a non-polar solvent. Egg fat is obtained as a by-product as the solvent is recovered for reuse in the system.

---

This invention relates to new egg products and processes of making them. More particularly, the invention relates to dry egg yolk solids from which a substantial portion of the readily extractable fat has been removed, and to processes for producing such defatted egg yolk solids.

Liquid whole egg consists, on the average, of about 64% white and about 36% yolk. The white contains approximately 12% solid matter, of a primarily proteinaceous nature. The yolk contains about 50% solids, of which a major portion is fat and a lesser portion portion is protein, the fat and protein being present in approximately a 2:1 ratio. A large proportion of the lipid appears to be bound to the protein in the form of lipo-protein complexes Some of this lipid is easily extractable with fat solvents, such as hexane, and this portion of the lipid is conventionally called "free lipid." It is referred to here as "free fat." The remaining lipid is referred to as "bound fat." It can be extracted, but only under more rigorous conditions. The term "fat" is used here, in connection with egg yolk, to refer to both kinds of fat, in a generic sense.

The egg white or egg albumen is essentially an aqueous solution of proteins containing small amounts of other materials such as minerals and sugars, and only a trace of fat. The egg yolk, on the other hand, contains virtually all of the fat and cholesterol of whole eggs. These latter components are present in combination with egg yolk proteins, as complex lipo-protein compounds. Consequently, many of the functional properties and nutritional aspects of the egg reside specifically in the yolk portion. This is evidenced by the incorporation of the yolk alone, as an ingredient in many basic food formulations.

As indicated in Table I, the yolk portion of the egg from hens on conventional feeds contains low levels of polyunsaturated fatty acids, moderately high levels of saturates, and an unusually high amount of cholesterol.

TABLE I—COMPOSITION OF EGG YOLK LIPIDS

Fatty acid composition:

| | |
|---|---|
| Saturated Fatty Acids, (S) percent | 34.0–36.0 |
| Monounsaturated Fatty Acids percent | 51.0–52.0 |
| Polyunsaturated Fatty Acids, (P) percent | 7.0–14.0 |
| Polyunsaturated/saturated ratio (P/S ratio) | 0.2–0.8 |
| Cholesterol content, mg. percent | [1] 3700–7700 |

[1] This corresponds to 2200–4600 mg. percent cholesterol in yolk solids, or 200–400 mg. Cholesterol in an average egg of about 50 gms. The cholesterol values in the present study were obtained by gas-liquid chromatography involving separation of the cholesterol from other fat components and measurement of the cholesterol as the acetate ester.

In the past few years, much emphasis has been placed on the desirability of reducing the amount of the more saturated fats and replacing them with polyunsaturated fats in the human diet. Recent medical evidence indicates that high serum cholesterol content may be linked to diseases of the vascular system. The evidence further shows that dietary cholesterol from egg yolks is more effective in raising serum cholesterol levels, than an equivalent amount of cholesterol incorporated as such in the diet. It is for this reason that many physicians and nutritionists frequently limit the quantities of eggs to be consumed by patients showing a tendency toward high serum cholesterol levels.

Eggs are a very popular and desirable component of the human diet, both in terms of organoleptic appeal as well as the high nutritional quality of the protein component. Hence, the modification or alteration of egg yolk solids to significantly decrease the cholesterol content and the fat of low ratio of polyunsaturates to saturates while retaining the quality of the egg protein would constitute an important innovation.

Several methods of improving eggs for inclusion in diets for the control of serum cholesterol have been suggested. One recent approach involved decreasing the saturated fat content and increasing the polyunsaturated fat content of egg yolks through changing the diet of the hens. Although the fatty acid composition of the yolk was markedly improved by this means, the cholesterol content of the yolk was found to be essentially independent of the type of fat used in the diet of the hens. In fact, there was an indication that the cholesterol level of the egg yolk increased as the degree of unsaturation of the dietary fat increased. Such eggs proved to be no better than conventional eggs in the control of the serum cholesterol level.

Another approach in providing the consumer with an egglike product, free of cholesterol, has been through the inclusion in the formulation of an imitation "yolk" which contains no natural yolk material at all, but is fabricated from vegetable sources (U.S. Patent No. 3,207,609). This product, after hydration and frying, is so different from scrambled eggs in odor, texture and taste as to be unacceptable to most users.

The comparatively poor flavor of conventional dry egg solids now on the market and many products which contain them has rendered them unacceptable to most customers and has therefore limited the use of eggs in this convenient form. This deteriorated flavor of conventional dry eggs during storage is proportional to the time and temperature of storage and resides for the most part in the egg fat; residual moisture is of critical importance during storage.

One object of the present invention is to provide a process for removing substantial portions of the free fat and of the cholesterol from egg yolk without significantly interfering with the capacity of the defatted egg yolk solids to re-form an emulsion with added oil.

Another object of the present invention is to provide an egg yolk solids product from which a substantial portion of the cholesterol and fat has been removed without significantly interfering with the capacity of the defatted egg yolk solids to re-form an emulsion with added oil.

Another object of the present invention is to provide an egg yolk product of substantially reduced cholesterol and fat content, in which the functional and nutritional properties of the protein remain essentially unaltered, as indicated by a protein solubility index value of 1.5 or greater.

Still another object of the invention is to provide a practical process for the production of egg yolk solids of improved flavor quality and stability.

Yet another object of the invention is to provide a new egg yolk solids product that is useful in its own right, and that is particularly well suited for use as an ingredient in the preparation of food compositions.

Other objects of the invention will be apparent hereafter from the specification and from the recitals of the appended claims.

The single figure of drawing is a schematic diagram showing one way in which the process of the invention may be practiced.

The present invention provides a method for producing an edible egg yolk product of reduced fat content which comprises solvent-extracting from egg yolk solids at least a substantial portion of the free fat content of the solids, while leaving in the solids a portion or all of the bound fat. A solution of extracted fat is obtained. The residual, extracted egg yolk solids are then separated from the fat solution. The solution of extracted fat is fractionated into a fat by-product and solvent, the latter being recovreed for reuse. The residual, extracted yolk solids are of reduced fat content as well as reduced cholesterol content.

The extraction process preferably is carried out by mixing substantially dry egg yolk solids with a fat solvent in proportitons such that the solvent is at least equal in weight to the weight of the dried egg yolk solids, preferably at least twice in weight in relation to the weight of the dried yolk solids. The mixture is heated with constant agitation to a temperature not in excess of 160° F., preferably not in excess of 120° F., for a period of time sufficient to permit extraction of a major portion of fat and of the cholesterol.

After extraction, the solids are separated from the solvent, as by filtration or by allowing the solids to settle and decanting the extracted fat in solvent solution. The solids are then rinsed with additional solvent in proportions such that the weight of added solvent is at least equal to the weight of the initial egg yolk solids. The yolk solids, freed of excessive solvent by filtration, are heated to temperatures high enough to evaporate the solvent, but under 160° F. and preferably under 120° F. to prevent denaturation of the egg yolk protein. The egg-fat is recovered from solvent by distilling off the latter for reuse in the system.

The extracted, edible egg yolk solids constitute a product from which at least 50% but not more than about 90% of the fat and at least 50% of the cholesterol have been removed. Such a product will contain at least 5 parts of the native fat based on 100 parts of original yolk solids. Using the process disclosed above, in a single extraction plus rinsing at moderate temperatures, at which significant protein denaturation is avoided, between 50% and 90% of the fat as well as at least 50% of the cholesterol are extracted.

The desired, partially defatted yolk solids, which are the objective of the present invention, must possess the following attributes:

(1) The partially defatted yolk solids must be readily soluble and/or dispersible in water, with or without salt in the aqueous phase.

(2) The partially defatted yolk solids on rehydration must exhibit the functional characteristics of unaltered egg yolk protein.

(3) The partially defatted yolk solids must be free from objectionable flavors to a degree at least equivalent to that noted with conventionally dried egg yolk solids and preferably to a degree equivalent to that noted with fresh egg yolk.

The present invention provides partially-defatted egg yolk solids having the previously-mentitoned attributes by removing the major portion of the natural fat and cholesterol from egg yolk, through mild solvent extraction of conventional egg yolk solids. The resultant egg product is natural defatted yolk material, with the functional properties of the protein essentially unaltered.

It is preferred to use non-polar fat solvents in making the defatted yolk of the present invention. Egg yolk contains high-density lipoprotein, apparently consitsing of protein chains almost completely covered with cholesterol and phospholipids. The proposed structure of the low-density lipoprotein in egg yolk appears to be an outside layer of protein, phospholipid, and cholesterol, surrounding a lipid core, thus resembling a micelle or microemulsion. Non-polar solvents extract mainly neutral lipids from the low-density lipoprotein microemulsion, and hardly any of the bound lipid from the high-density liproprotein. The large yield of cholesterol and cholesterol esters in the solvent extract, and the relatively less yield of phospholipid in the non-polar solvent extracts, indicate that the coalesced (easily extractable) lipids and cholesterol but not phospholipids, may be removed from these entities without disrupting their fundamental integrity.

When extracting egg yolk solids with a non-polar solvent only, such as n-hexane, there appears to be little, if any, damage to the functional properties of the remaining protein. The treatment of egg yolk solids with a non-polar solvent extracts readily the coalesced or easily extractable fat. The percentage of theoretical or coalesced fat, that can easily be removed by a non-polar solvent, is in excess of 70%. Fortunately, much of the cholesterol in egg yolk solids is contained in the low-density lipoprotein fraction and is removed with the coalesced fat fraction. Consequently, extraction of yolk solids by a non-polar solvent, when removing about 70% to about 90% of the total fat, also removes 70% to 98% of the total cholesterol on a dry weight basis.

In yolk solids that have been extracted with a non-polar solvent, it is no simple matter to replace the neutral, extracted egg fat with a vegetable (polyunsaturated) oil. If severe extraction conditions have been used, or if a polar solvent has been used, the replacement is even more difficult, if it is desired to restore the functional properties of the yolk, since it is difficult to reconstruct the natural lipid-protein relationship which exists between the protein and the natural egg fat. Hence, it is preferable to use non-polar solvents such as hexane, cyclohexane, heptane, tetrachloroethylene, or the like.

Analytically, more efficient or complete removal of the lipid constituents from protein material consists of disrupting the lipid-protein bonds by a polar solvent such as alcohol, thus permitting the subsequent extraction of the lipids by a non-polar solvent such as ethyl ether. These two processes can be combined through the use of solvent mixtures such as ethanol-ether.

Although a polar-non-polar solvent extraction system would be desirable from the extraction efficiency standpoint, the use of a polar solvent for extraction may impair the functional characteristics of the remaining protein.

The amount of information available on egg yolk protein and lipids and their complex lipid-protein structure is very meager in comparison to that available on egg white protein. It is only in the past few years that investigators have been interested in the yolk portion of the egg and have attempted to separate the lipid from the protein fraction. Conventional solvent extraction processes yield a defatted product unsuitable for reconstitution.

The extraction process of the present invention is designed to produce partially defatted yolk products that retain substantially all of the functional and quality attributes of the protein fraction of dried natural egg yolks. Sufficient lipid material is retained in the product of this invention to enable the reestablishment in the protein-lipid relationship by means of a subsequent process. The extracted egg oil is a by-product for use in feeds or the like.

Suitable solvents for use in the processes of the present invention include non-polar solvents and mixtures of non-polar solvents and polar solvents, wherein at least a substantial portion o fthe mixture is a non-polar solvent. When the polar solvent is present, it is used in such an amount that, under the extraction conditions employed, there is minimal deterioration of the functional characteristics of the yolk, so that reconstruction is feasible for the production of an easily dispersible, heat-coagulable product. Hexane is a prefered non-polar solvent. It is a liquid at the temperatures preferred for use in the present invention, and because of its low boiling point, it is easily removed from both the extracted oil (i.e. fat) product as well as from the extracted egg yolk solids. Also, hexane is relatively inexpensive and hence allows the most economical process. It is desirable to use a quantity of solvent at least equal in weight to that of the dried egg solids. Preferably, a ratio of about 3:1 of solvent to solids on a weight basis is used.

Temperatures below and somewhat above room temperature may be used for the extraction. The preferred temperature is about 80° F., but temperatures as high as 120° F. or higher can be used. The upper temperature limit is that at which the protein content of the yolk solids is adversely affected, that is, the temperature at which and above which the functional properties of the extracted yolk solids begin to be impaired.

Although it is most expedient to subject only the egg yolk to extraction, the process is equally applicable to whole egg. Preferably, whole eggs or separated egg yolks are dehydrated, and the resulting dehydrated is used as the starting material in the present invention. A moisture content up to about 10% by weight, based on the dried egg, may be tolerated in the material to be extracted in the present process without adversely affecting the resulting products.

The defatted egg yolk described in this application has many uses in the formulation of food products. However, it is preferred to utilize the unique physical, chemical, and organoleptic properties of the defatted egg yolk product, prepared according to this disclosure, in making low-cholesterol products in which the egg oil of low P/S ratio, removed by the process described herein, is replaced with vegetable oil of high P/S ratio.

Example 1

In one demonstration of the present invention, dry egg yolk solids having a moisture content less than 5% were slurried in hexane in proportions such that the solvent to solids weight ratio was 3:1. The temperature of the slurry was raised to about 80° F. for a period of about 30 minutes. The solids were then separated from the hexane solution of fat by filtration. The filter cake was then rinsed with an amount of hexane equal in weight to the original weight of the dried egg yolks, filtered, and the rinse solution was then added to the initial solution of fat and hexane. The solids were then air dried in a tray drier at 100° for 25 hours, to remove the solvent.

The solution of fat was distilled, to separate the hexane and egg oil. The hexane was condensed for subsequent use in further extractions. The egg product is a valuable component for use in feed preparations and the like.

As shown in Table II, the extracted egg yolk solids contained 19% of the original free fat and 18% of the original cholesterol content. Because the free fat and cholesterol made up 57.6% of the egg yolk, and inasmuch as 81% of the free fat was removed, the egg yolk solids product weighed exactly half its original weight, prior to the extraction. The extracted yolk solids, after drying, were a free-flowing, finely divided, particulate mass, of good color and when rehydrated, had a natural, clean, egg flavor.

The protein solubility index is indicative of the extent of denaturation of the protein in the egg yolk due to heat treatment during extraction. The test for determining the protein solubility index is basically described in the article by Bishov and Mitchell, Food Research, vol. 19, pages 367–372 (1954). In adition, the solubility index method is discussed in U.S. Patent 2,844,470, Akerboom-Melnick.

The solubility index for conventionally dried egg yolk solids is 2.3. Any lessening of the solubility index represents denaturation of the protein to a degree. The defatted egg yolk solids of Example 1 exhibit a protein solubility index of 1.8. Since the reproductibility of the method is ±0.1 units, this difference would appear to indicate that some denaturation had occurred during the defatting operation. However, a maximum protein solubility index of 1.8 was found for egg yolk solids defatted in the laboratory under extremely mild conditions; hence, a protein solubility index of 1.8 represents no significant protein denaturation for present purposes.

TABLE II

|  | Conventional, stabilized egg yolk solids | Novel defatted egg yolk solids* |
|---|---|---|
| Moisture, percent | 4.8 | 1.0 |
| Total fat, percent | 57.6 | 11.1 |
| Protein, percent | 33.4 | 33.4 |
| Cholesterol, percent | 2.98 | 0.53 |
| Protein solubility index | 2.3 | 1.8 |

*Results are calculated on the basis of the original product weight.

The novel, defatted, low-cholesterol egg yolk solids of this invention may be used in formulations as a replacement for conventional egg yolk solids where a low-fat, low-cholesterol, low-calorie egg product is desired. Because the non-lipid components of the egg yolk have been concentrated by defatting, a smaller quantity of the defatted egg yolk solids can be employed in many food formulations to achieve equivalent results.

It is preferred, however, to replace the fat extracted from the egg yolk solids with an equivalent amount of a vegetable oil that is free of cholesterol and that has a high P/S ratio. This product would find use in foods to the same extent as conventionally dried egg yolk solids.

After prolonged storage (one year) of the dry, extracted yolk solids at room temperatures, no deterioration of the functional properties or flavor of the yolk solids could be detected.

The following additional example illustrates the invention further. All percentages are by weight and all temperatures in degrees Fahrenheit, unless otherwise specified.

Example 2

Hexane extractions.—Hexane and dry egg yolk solids were placed in an agitated, closed kettle. Charges of up to 15 pounds of dry egg yolk solids and the corresponding quantity of solvent as shown in Table III below were added. After extracting 30 minutes at the temperature specified in Table III, the kettle contents were separated on a filter and the solid substance remaining on the filter was rinsed the number of times specified in Table III with a quantity of hexane, equivalent to the initial weight of the egg yolk solids. After each rinse, the suspension was filtered and the rinse solution added to the initial solution of fat.

The rinsed cake was then dried in a tray drier at 100° F. The resulting dried product was pale yellow in color with a generally good appearance. It was free-flowing and although lighter in color, had the same visual characteristics as the yolk solids prior to extraction. Analysis of the product before and after extraction appear in Tables III and IV below.

TABLE V.—COMPOSITION OF THE LIPID PORTION OF EGG YOLK AND THE HEXANE EXTRACT OF EGG YOLK SOLIDS

|  | Egg yolk lipids theoretical | Hexane extract of egg yolk solids |
|---|---|---|
| Total lipids, percent | 100 | 99.6 |
| Phospholipids, percent | 27–30 | 10.8 |
| Triglycerides, percent | 65–66 | 84.5 |
| Cholesterol, percent | 5.2 | 4.3 |
| Polyunsaturated/saturated ratio | 0.2–0.8 | 0.45 |

GENERAL

It may be seen from the description above that the present invention provides practical means of obtaining a substantially fat-free and cholesterol-free egg yolk product that may be used as an ingredient in many food products, such as, for example, dry cake mixes, sponge cakes, custards, and the like. These food products have the advantage of the low fat and low cholesterol content of the yolk solids. The invention also provides as a by-product,

TABLE III

| | Analyses of yolk solids prior to extraction | | | | | Extraction conditions | | |
|---|---|---|---|---|---|---|---|---|
| Sample | Percent moisture | Percent fat | Percent cholesterol | Percent protein | Solubility index | Solvent to dry substance ratio | Extraction temp., ° F. | Number of rinses |
| (A) Standard yolk solids | 3.5 | 58.5 | 2.36 | 34.3 | 2.2 | 3:1 | 80 | 2 |
| (B) Standard yolk solids | 3.5 | 58.5 | 2.36 | 34.3 | 2.1 | 3:1 | 100 | 2 |
| (C) Standard yolk solids | 3.5 | 56.5 | 3.2 | 34.3 | 2.0 | 3:1 | 80 | 2 |
| (D) Standard yolk solids | 2.7 | 56.7 | 3.68 | | 2.2 | 3:1 | 75 | 2 |
| (E) Stabilized yolk solids | 3.4 | 54.5 | 4.17 | | 2.0 | 3:1 | 75 | 1 |
| (F) Stabilized yolk solids | 3.4 | 54.5 | 4.17 | | 2.0 | 3:1 | 75 | 2 |
| (G) Stabilized yolk solids | 3.7 | 58.5 | 3.54 | | 2.0 | 3:2 | 75 | 2 |
| (H) Stabilized yolk solids | 3.7 | 58.5 | 3.54 | | 2.0 | 3:1 | 75 | 4 |
| (J) Stabilized yolk solids | 3.7 | 58.5 | 3.54 | | 2.0 | 3:1 | 155 | 2 |

NOTE:
Standard egg yolk solids are conventionally dried, otherwise unaltered egg yolk solids.
Stabilized egg yolk solids are conventionally dried egg yolk solids which have been treated for the removal of glucose.

TABLE IV

| | Analyses of extracted yolk solids* | | | | | | |
|---|---|---|---|---|---|---|---|
| | Percent moisture | Percent fat | Percent cholesterol | Percent protein | Solubility index | Percent fat removed | Percent cholesterol removed |
| Sample: | | | | | | | |
| A | 2.8 | 8 | 0.29 | 33.2 | 1.8 | 86 | 88 |
| B | 3.9 | 9.9 | 0.39 | 32.7 | 1.7 | 83 | 83 |
| C | 3.0 | 8.5 | 0.26 | 33.2 | 1.7 | 85 | 92 |
| D | 3.8 | 9.9 | 0.68 | | 1.8 | 83 | 82 |
| E | 2.3 | 13.8 | 1.31 | | 1.6 | 75 | 70 |
| F | 4.7 | 9.7 | 1.06 | | 1.8 | 82 | 75 |
| G | 1.0 | 11.7 | 0.69 | | 1.8 | 80 | 81 |
| H | 1.7 | 10.1 | 0.07 | | 1.6 | 83 | 98 |
| J | 1.2 | 10.6 | 0.36 | | 1.5 | 82 | 90 |

* The values were calculated back to the original product.

It may be seen from the above that under these conditions the process of the invention is capable of extracting at least 70% of the fat and at least 70% of the cholesterol, while simultaneously the protein remains substantially unaltered.

These results indicate that two rinses with hexane will remove a higher percentage of fat and cholesterol than one rinse (Sample E). Additional rinses with hexane, however, have little, if any, effect on the percentage of fat removed, but will increase the amount of cholesterol which is extracted (Sample H).

EXAMPLE 3

Recovery of the egg oil.—The hexane-egg oil solution from the extraction of Example 1 was further treated to separate the egg oil from the hexane. The hexane was separated by distillation, using mild heat, and was subsequently condensed for reuse as a solvent in the system.

As shown in Table V, a comparison of the composition of the hexane extracted egg oil from Example 1 with the actual composition of the lipid portion of egg yolk indicates close agreement except for the phospholipid content. It is apparent that a substantial portion of non-extractable fat is in the form of phospholipids.

egg oil that is suitable for many applications in feeds and industrial uses.

Although less preferred, extractions similar to those described in detail above have been carried out using mixtures of non-polar solvents with minor amounts up to about 25% by weight, and preferabsy less than 10% by weight, of polar solvents. For example, a solvent mixture of 90% hexane and 10% methanol by weight of the solvent mixture, employed at 80° F. for ten minutes in a closed kettle, with mild agitation, removes over 90% of the fat and over 90% of the cholesterol from the egg yolk solids. However, some loss in functional properties of the extracted product may be observed, upon reconstitution.

Other polar solvents, that may be employed, include, for example, acetone, dioxane, ethyl alcohol, and the like. The particular amount of each, that may be included in the solvent mixture without impairment of the functional properties of the extracted yolk solids upon reconstitution, depends upon the extraction conditions employed; the lower the temperature and the shorter the time for extraction, the less is the impairment of the functional properties of the egg protein.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and limits of the appended claims.

I claim:

1. A method for producing a novel edible egg yolk product having a reduced content of fat and of cholesterol, which comprises:

extracting dried egg yolk solids with a solvent selected from the group consisting of non-polar organic solvents and mixtures of non-polar organic solvents with minor amounts of polar organic solvents, to dissolve in the solvent at least 50% by weight of the original fat content and at least 50% by weight of the original cholesterol content of said solids, but not more than 90% of the original fat content, under extraction conditions that avoid significant impairment of the functional properties of the residual yolk solids, to obtain a slurry having as its liquid phase a solution of the extracted fat and of the extracted cholesterol, and as its solid phase the extracted egg yolk solids that are reduced in fat content and in cholesterol content;

separating the residual yolk solids from the liquid phase; and recovering the residual yolk solids substantially free from solvent, and having reduced fat and cholesterol content, and containing a portion of the original bound fat.

2. A process in accordance with claim 1, wherein the solvent comprises hexane.

3. A process in accordance with claim 1, wherein the amount of fat extracted is at least 70% of the total fat content of the egg yolk solids and the amount of cholesterol extracted is at least 70% of the original cholesterol content of the egg yolk solids.

4. A process in accordance with claim 1, including as added steps:

fractionating the solution of fat and of cholesterol into egg oil and solvents;

recovering the egg oil; and recovering the solvent for reuse in the process.

5. A process in accordance with claim 1, wherein the amount of solvent present is at least equal to the weight of the egg yolk solids and the extraction is carried out at a temperature from about room temperature to about 120° F. for a period of time from about one minute to about one hour.

6. A process for producing a stable egg yolk product from which a major portion of each of the natural contents of the fat and cholesterol have been removed which comprises:

subjecting dried egg yolk solids to extraction treatment with a solvent selected from the group consisting of non-polar organic solvents and mixtures of non-polar organic solvents with less than about 25% of polar organic solvents, under conditions that avoid significant impairment of the functional properties of the yolk solids including an amount of solvent that is at least equal to the weight of the egg yolk solids and at a temperature from about room temperature to about 120° F. and for a period of time from about one minute to about one hour;

thereafter separating the residual yolk solids from the solution of extracted material; and drying the residual yolk solids to a free-flowing particulate form.

7. A process in accordance with claim 6, wherein the non-polar solvent is hexane.

8. A process in accordance with claim 6, wherein the amount of solvent employed for the extraction is at least 3 times the amount of dried egg yolk solids being extracted, by weight.

9. A process in accordance with claim 6, including as an added step one or more rinses of the residual solids after extraction with an amount of solvent that is at least equal to the weight of the original solids.

10. Dried egg yolk solids from which at least about 50% of the original fat and at least about 50% of the original cholesterol content but not more than 90% of the original fat content have been extracted and that retain a portion of the original bound fat.

11. A product in accordance with claim 10, wherein the protein content of the extracted egg yolk solids has a solubility index of at least about 1.5.

References Cited

UNITED STATES PATENTS 2,619,425  11/1952  Levin _____ 99—208

FOREIGN PATENTS 568,276  12/1958  Canada _____ 260—397.25
803,071  10/1958  Great Britain _____ 99—113

A. LOUIS MONACELL, Primary Examiner

W. R. BOVEE, Assistant Examiner

U.S. Cl. X.R.

99—114, 161, 210